(12) United States Patent
Jorgensen et al.

(10) Patent No.: US 8,364,214 B2
(45) Date of Patent: Jan. 29, 2013

(54) ELECTRICALLY RELEASED MAGNET LOCKING MECHANISM

(75) Inventors: Claus H. Jorgensen, Frederiksberg (DK); Niels P. Emme, Hellerup (DK); Thomas Vad, Lynge (DK); Jeppe Goltermann, Kastrup (DK); Vooi Kia Tan, Copenhagen (DK)

(73) Assignee: Nokia Corporation, Espoo (FI)

( * ) Notice: Subject to any disclaimer, the term of this patent is extended or adjusted under 35 U.S.C. 154(b) by 1591 days.

(21) Appl. No.: 11/639,453

(22) Filed: Dec. 14, 2006

(65) Prior Publication Data

US 2008/0146295 A1  Jun. 19, 2008

(51) Int. Cl.
*H04M 1/00* (2006.01)

(52) U.S. Cl. ............... 455/575.3; 455/90.3; 455/128; 455/347

(58) Field of Classification Search ............... 455/575.3, 455/575.4, 575.1, 90.3, 128, 347, 575.8
See application file for complete search history.

(56) References Cited

U.S. PATENT DOCUMENTS

| | | | | |
|---|---|---|---|---|
| 5,706,332 A | * | 1/1998 | Nagai | 455/575.3 |
| 6,073,027 A | * | 6/2000 | Norman et al. | 455/575.4 |
| 7,577,467 B2 | * | 8/2009 | Schechtel et al. | 455/575.4 |
| 7,643,857 B2 | * | 1/2010 | Yang et al. | 455/575.4 |
| 2002/0022496 A1 | * | 2/2002 | Park | 455/550 |
| 2002/0061733 A1 | * | 5/2002 | Wang | 455/90 |
| 2003/0174240 A1 | * | 9/2003 | Wada et al. | 348/374 |
| 2009/0275361 A1 | * | 11/2009 | Takahashi | 455/556.1 |

FOREIGN PATENT DOCUMENTS

WO  WO-2006/026035 A1  3/2006

* cited by examiner

*Primary Examiner* — Vladimir Magloire

(74) *Attorney, Agent, or Firm* — Harrington & Smith

(57) ABSTRACT

A hand-held portable electronic device housing latch and release system including a permanent magnet, a magnet latch plate, a spring and an electromagnetic coil. The permanent magnet is adapted to be connected to a first housing member of a hand-held portable electronic device and the magnet latch plate is adapted to be connected to a second housing member. A magnetic field of the permanent magnet is adapted to exert a magnetic holding force on the magnet latch plate when the first and second housing members are in a first position relative to each other. The spring is adapted to bias the first and second housing members away from the first position. The electromagnetic coil is adapted to at least partially reduce the magnetic holding force by the permanent magnet on the magnet latch plate.

21 Claims, 7 Drawing Sheets

ELECTRICALLY RELEASED MAGNET LOCKING MECHANISM

BACKGROUND OF THE INVENTION

1. Field of the Invention

The invention relates to a latching system and, more particularly, to a latching system having a permanent magnet and a latch release system having an electromagnetic coil.

2. Brief Description of Prior Developments

WO 2006/026035 A1 discloses an electronic device having a latch with a pair of magnets or a magnet and a ferrous material member. In mobile telephones, there are an increasing number of mechanisms that are used for various transformations of mechanical elements. This includes, for example, the opening and closing of a small door (e.g. for SIM and memory cards), the releasing of a battery cover, and the opening and closing of the product itself (e.g. in the case of a fold- or slide-product).

The various mechanisms used so far very often have limitations to the quality of "feel" experienced by the user. Furthermore, size and complexity is also often a disadvantage of the purely mechanical mechanisms; since they need to be physically close to a push button (or other means of mechanical interface) accessible to the user. Activating the mechanism by means other than a pure mechanical actuation from the user is not possible. This means that an additional motor or electromechanical actuator is needed if actions are to be executable from the product's software.

In the case of the opening of a fold product, such as a flip-phone type of telephone for example, the vast majority of the products in the market are operated by the user manually opening the product at least about 50 percent of its total opening angle before it will automatically open the rest of the opening angle (such as about 90 degrees of a 170 degrees fold product total opening angle). Some products have emerged with a purely mechanical "push-to-open" functionality such as the NOKIA Model 6131. However, they all suffer from the limitations noted above. A few mobile phone products have been launched with an electromotor doing the opening and closing work of housing members.

Permanent magnets have been used in some products to keep the product closed, such as the NOKIA Model 9300 Communicator for example. In some cases, also as part of the opening release mechanism, by physically dislocating the magnets, thus weakening the magnet field, this can allow the product's hinge spring to open the product as described in WO 2006/026035 A1.

There is a desire for a new type of system for latching and unlatching housing components in a hand-held portable electronic device.

SUMMARY OF THE INVENTION

In accordance with one aspect of the invention, a hand-held portable electronic device housing latch and release system is provided including a permanent magnet, a magnet latch plate, a spring and an electromagnetic coil. The permanent magnet is adapted to be connected to a first housing member of a hand-held portable electronic device and the magnet latch plate is adapted to be connected to a second housing member. A magnetic field of the permanent magnet is adapted to exert a magnetic holding force on the magnet latch plate when the first and second housing members are in a first position relative to each other. The spring is adapted to bias the first and second housing members away from the first position. The electromagnetic coil is adapted to at least partially reduce the magnetic holding force by the permanent magnet on the magnet latch plate.

In accordance with another aspect of the invention, a hand-held portable electronic device is provided comprising electronic circuitry, a housing, a latch system, and a latch release system. The electronic circuitry includes a transceiver, a battery and a display. The housing has the electronic circuitry therein. The housing comprises a first housing member movably connected to a second housing member between a first position and a second position. The housing comprises at least one spring adapted to bias the first and second housing members in a direction away from the first position and towards the second position. The latch system is for latching the first and second housing members in the first position. The latch system comprises a permanent magnet and a ferromagnetic member on respective ones of the housing members. The latch release system comprises an electromagnetic field generator connected to the housing. The electromagnetic field generator is adapted to be powered by the battery of the hand-held portable electronic device. The electromagnetic field generator is adapted to at least partially reduce magnetic attraction of the permanent magnet on the ferromagnetic member to allow the first and second housing members to be moved relative to each other by the spring.

In accordance with another aspect of the invention, a method of manufacturing a hand-held portable electronic device is provided comprising connecting a permanent magnet to a first housing member of the hand-held portable electronic device; connecting a ferromagnetic member to a second housing member; movably connecting the first and second housing members to each other, wherein the first and second housing members are movable relative to each other between a first position and a second position, wherein the first and second housing members are biased by a spring in a direction away from the first position; and connecting an electromagnetic coil to the first or second housing member in proximity to the permanent magnet when the housing members are in the first position to allow a magnetic field of the coil to reduce a magnetic attraction of the permanent magnet on the ferromagnetic member.

In accordance with another aspect of the invention, a method of opening a hand-held portable electronic device is provided comprising providing the device with a first housing member having a permanent magnet and a second housing member having a ferromagnetic member, wherein the first housing member is adapted to be held in a single hand of a user, wherein the first and second housing members are maintained at a first position by the permanent magnet and the ferromagnetic member, and wherein a spring exerts a biasing force to bias the housing members in a direction away from the first position; and energizing an electromagnetic coil of the hand-held portable electronic device with power from a battery of the hand-held portable electronic device to reduce a magnetic attraction of the permanent magnet on the ferromagnetic member and thereby allow the spring to move the housing members away from the first position.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
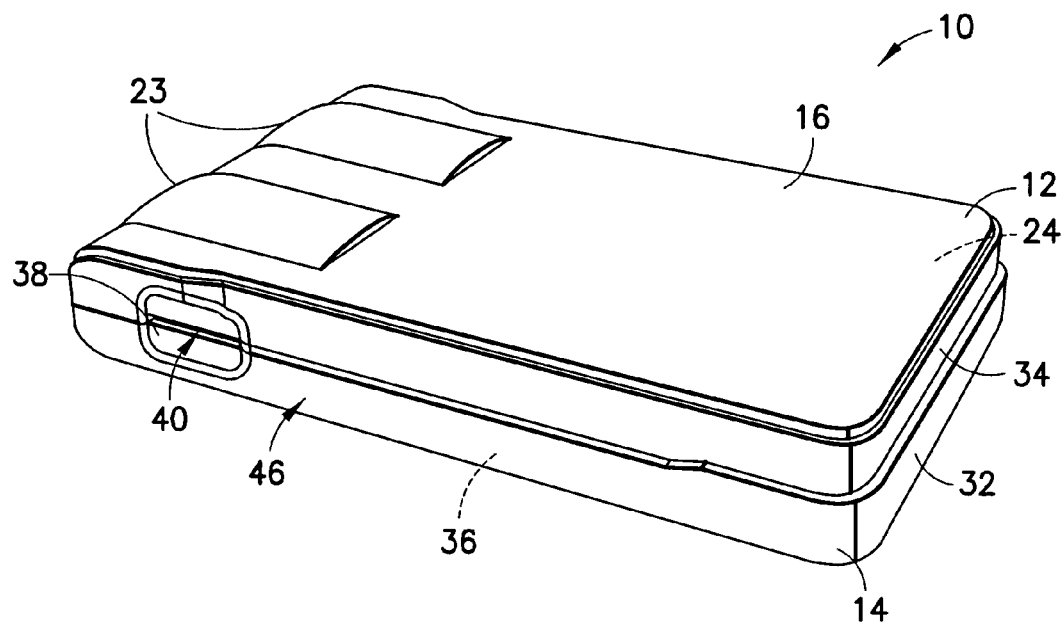
FIG. 1 is a perspective view of a mobile telephone comprising features of the invention.

Referring to FIG. 1, there is shown a perspective view of a portable electronic device 10 incorporating features of the invention. A similar device is described in U.S. patent application Ser. No. 11/604,417 filed Nov. 27, 2006 which is hereby incorporated by reference in its entirety. Although the invention will be described with reference to the exemplary embodiments shown in the drawings, it should be understood that the invention can be embodied in many alternate forms of embodiments. In addition, any suitable size, shape or type of elements or materials could be used.

In this embodiment the portable electronic device 10 is a mobile telephone. More specifically, the telephone has a flip-phone type of design. However, features of the invention could be used with any type of telephone having housing members which are movable relative to each other, such as a slide phone for example. In addition, features of the invention could be used in any type of portable electronic device having housing members which are movable relative to each other, such as a gaming device, a PDA, etc.

Figure 2:
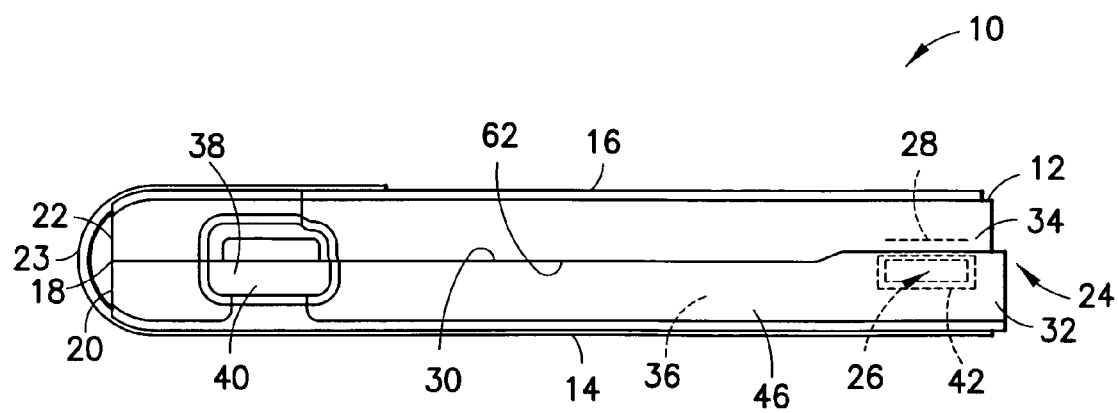
FIG. 2 is a side view of the telephone shown in FIG. 1.
Figure 3:
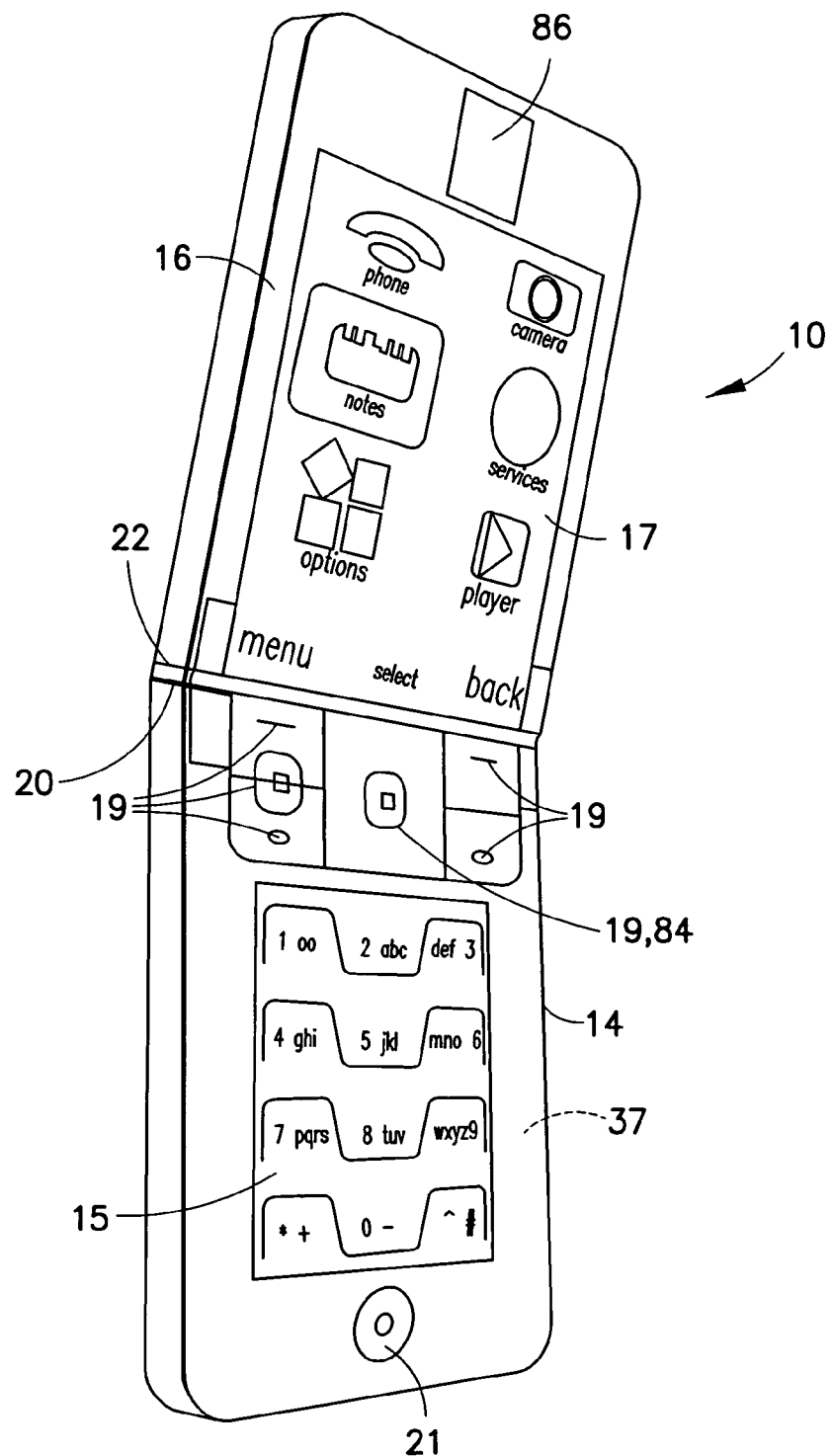
FIG. 3 is a perspective view of the telephone shown in FIG. 1 is an open, unfolded position.

The telephone 10 generally comprises a housing 12 having a first housing member 14 and a second housing member 16. Referring also to FIGS. 2-3, the first and second housing members 14, 16 are pivotably connected to each other by a hinge 18 between a closed position as shown in FIGS. 1-3 and an open position. In this embodiment the hinge 18 is a living hinge. However, in alternate embodiments the hinge could comprise any suitable type of pivotable connection. As noted above, features of the invention could be used with a slide phone. Therefore, the connection of the housing members to each other might not be a pivotable connection. The hinge 18 connects the top ends 20, 22 of the housing members to each other.

Referring also to FIG. 3, in this embodiment the first housing member 14 generally comprises electronic circuitry 36, a battery 37, a keypad 15, control keys 19 including a joystick 84, and a microphone 21. The second housing member 16 generally comprises a display 17 and a sound transducer or speaker 86. When the first and second housing members are in their closed position, the display is protectively covered by the first housing member 14 and the keypad is protectively covered by the second housing member 16.

In order to use most features of the telephone, the second housing member 16 must be unlatched from the first housing member 14 and moved to its open position. This uncovers the display and the keypad. In this embodiment the telephone has leaf springs 23 which are adapted to bias the housing members 14, 16 towards the open position. However, any suitable system for biasing the housing members towards an open position could be provided. Alternatively, a system for biasing the housing members towards an open position might not be provided.

The telephone 10 also comprises a latch system 24 for latching the first and second housing members at the closed position. In this embodiment the latch system comprises a permanent magnet 26 in the first housing member 14 and a suitable magnetically latchable ferromagnetic member 28 in the second housing member 16. The magnet 26 and latchable member 28 are located proximate top and bottom sides 30, 62, respectively, of the bottom ends 32, 34 of the housing members 14, 16. The magnet 26 and the latchable member 28 function as a latch to retain the second housing member 16 against the top side 30 of the first housing member 14 at the closed position. The ferromagnetic member 28 could be a steel plate, for example. It should also be understood that the ferromagnetic member 28 could be a second permanent magnet. Thus, reference to "28" herein should be understood to be any suitable type of ferromagnetic member including a permanent magnet or metal member made of ferrous material.

Figure 4:
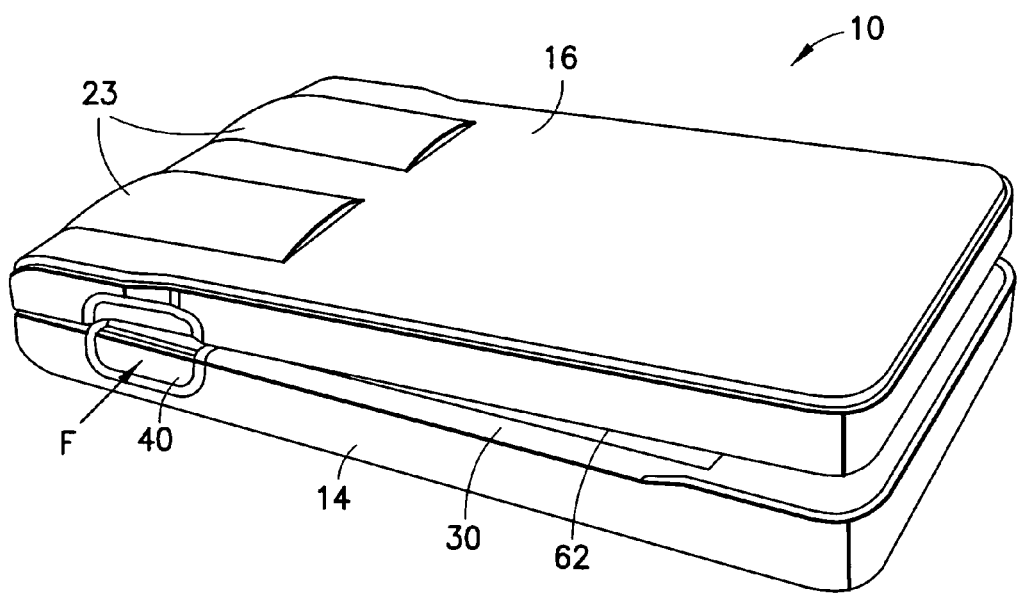
FIG. 4 is a perspective view of the telephone as shown in FIG. 1 with the opening system actuated.
Figure 5:
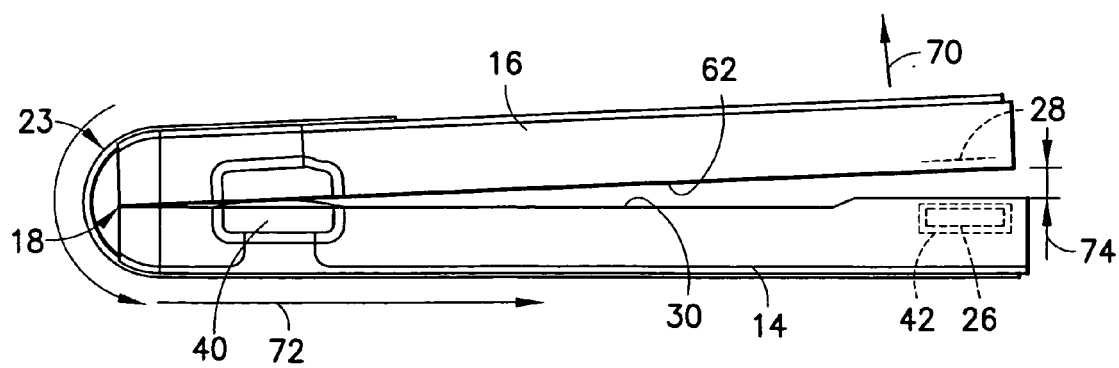
FIG. 5 is a side view of the telephone shown in FIG. 4.

In order to overcome the latching system 24 and move the second housing member 16 from the closed position, the telephone 10 comprises a latch release or opening system 38. With the magnetic latch system in this embodiment, the latchable member 28 need only to be moved away from the magnet 26 a relatively small amount, such as shown by distance 74 in FIG. 5, to substantially overcome the magnetic holding force of the magnet. As seen with reference to FIGS. 4-5, when the release system is actuated, the springs 23 can bias the second housing member 16 towards the open position. In this embodiment, the leaf springs 23 are adapted to slide into the first housing member 14 as indicated by arrow 72 as the housing opens to its open position. However, as noted above, any suitable hinge or spring arrangement could be provided.

Figure 6:
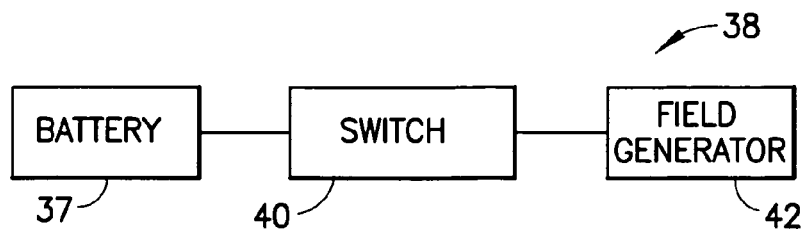
FIG. 6 is a diagram illustrating components of the latch release system of the device shown in FIGS. 1-5.

Referring also to FIG. 6, in this embodiment the opening system 38 generally comprises the battery 37, a user actuated switch or button 40, and an electromagnetic field generator 42. In this embodiment the generator 42 is an electromagnetic coil. In this embodiment, the switch 40 is located at a lateral side 46 of the first housing member 14. However, in alternate embodiments, the switch could be located at any suitable location. As described below, a user actuated switch might not be provided. In this embodiment, when the user actuates the switch 40, the coil 42 is energized by electricity from the battery 37. The coil 42 generates a magnet field. This field is generally reverse to the magnetic field of the permanent magnet 26. The coil 42 is located in close proximity to the permanent magnet 26; perhaps surrounding it. Thus, the electromagnetic coil 42 is adapted to at least partially cancel or neutralize the magnetic field of the permanent magnet. This at least partially reduces the magnetic holding force by the permanent magnet 26 on the magnet latch plate 28. This, in turn, allows the springs 23 to move the housing members 14, 16 away from the closed position towards the open position relative to each other as indicated by arrow 70 in FIG. 5.

With the invention, the coil 42, permanent magnet 26, and/or ferromagnetic member 28 can be located or hidden behind or underneath a cover which forms part of the first or second housing members 14, 16. The cover could be user removable. The user actuated switch 40 could be located on either the first or second housing members 14, 16, and could be located at any suitable or random location selected by the manufacturer. In an alternate embodiment the device could comprise two or more cooperating magnets forming two sub-mechanisms located in two spaced areas with, for example, an individual metal plate 28 for each or perhaps a single common metal plate for both.

The invention generally comprises a permanent/electromagnet based locking mechanism. The permanent magnet, by magnetic force attraction to an opposing steel anchor plate, keeps the spring loaded mechanism closed when the system is at rest. When release is needed, the magnet field (and thus, the holding force) from the permanent magnet is neutralized by means of the opposing magnet field generated into the system by a current running in the coil. This causes the magnet holding force to go to zero for a short while; allowing the mechanism's spring to open the system.

With the invention, push-to-open functionality can be provided in a fold product. The product opens by push of a button or by a signal from the software (e.g. incoming call, SMS with a certain text, touch panel or voice activated. The invention can also be uses as a push-to-open functionality in a slide product, or a push-to-open functionality in a swivel product. The invention can also be used in any release of moving mechanics: a SIM door, a memory card door, a battery cover, a camera lens protector, an electrical connector door, etc. The invention provides the advantage in that the mechanism can be activated by input not only limited to the push of a mechanical button, but any signal from the product software. The physical position of a user activated push-button (if any) is completely free of the mechanism location itself. The lock can also be hidden behind the outer covers. The size of the lock mechanism (magnet+coil+anchor plate) can be made quite small, even compared to conventional purely mechanical solutions. Although the system uses battery power, this is relatively small; required only for a sufficiently small amount of time to move the magnet plate sufficiently far away from the permanent magnet to no longer be concerned about the magnetic field of the magnet (such as only about 15 degrees of rotation in a flip-phone type of telephone for example).

Figure 7:
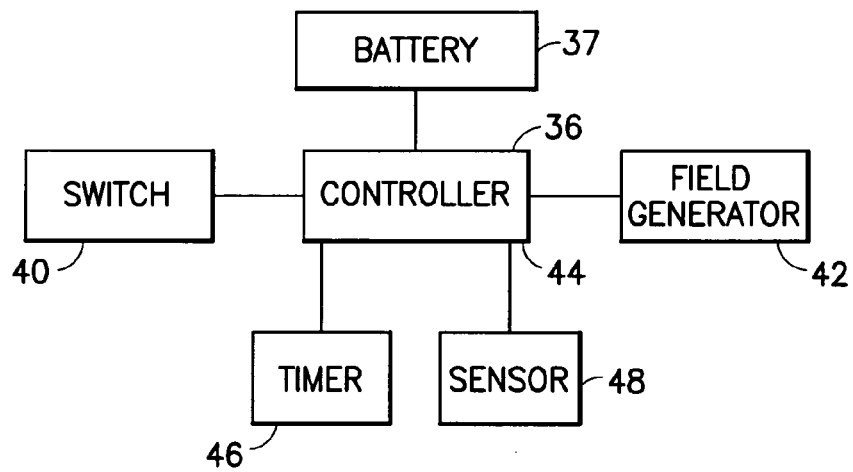
FIG. 7 is a diagram illustration components of an alternate embodiment of the diagram shown in FIG. 6.

Referring also to FIG. 7, an alternate embodiment is shown. In this embodiment the electronic circuitry 36 includes a controller 44 and perhaps a timer 46 and/or a sensor 48. The controller 44 could include a microprocessor on a printed circuit board for example. The electronic circuitry 36 also preferably comprises a memory and software or firmware for performing applications of the device 10. The battery 37, the switch 40 and the coil 42 are coupled to the controller 36. When the user actuates the switch 40, the controller 36 can control the delivery of current from the battery 37 to the coil 42. In this embodiment, the controller 44 is adapted to discontinue delivery of current from the battery 37 to the coil 42 after a predetermined period of time as indicated by the timer 46. Alternatively or additionally, the controller 44 can be adapted to discontinue delivery of current from the battery 37 to the coil 42 based upon a signal from the sensor 48. For example, the sensor 48 could be adapted to sense the relative position of the housing members 14, 16 relative to each other. Thus, the sensor 48 could be adapted to send a signal to the controller 44 when the housing members 14, 16 are moved apart a predetermined angle, such as 15 degrees for example, or a predetermined distance. In another alternate embodiment, the sensor 48 could be adapted to be used by the controller to signal when the coil 42 should be energized separate and apart from the user actuated switch 40.

Figure 8:
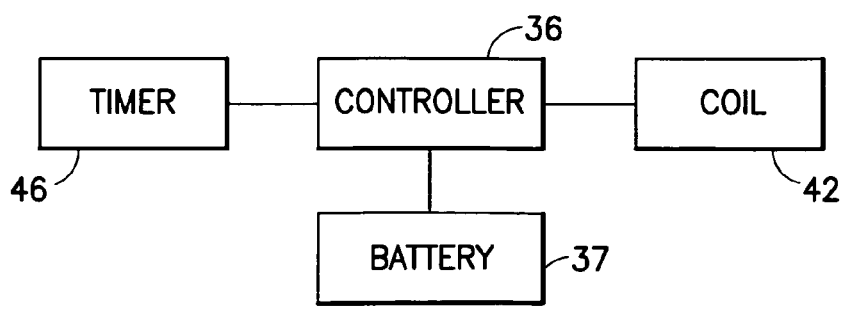
FIG. 8 is a diagram illustration components of an alternate embodiment of the diagram shown in FIG. 6.

Referring also to FIG. 8, this embodiment illustrates a device which does not have a user actuated switch. In this embodiment the controller 36 is adapted to energize the coil 42 based upon an occurrence or event occurring in the electronic circuitry. For example, a signal from the software such as an incoming call, a short message service (SMS) message with certain text, a touch panel entry or a voice activated signal. These are only examples and should not be considered as limiting. The device could additionally have a user actuatable switch as well. The controller 44 could be adapted to discontinue delivery of current from the battery 37 to the coil 42 after a predetermined period of time as indicated by the timer 46.

Figure 9:
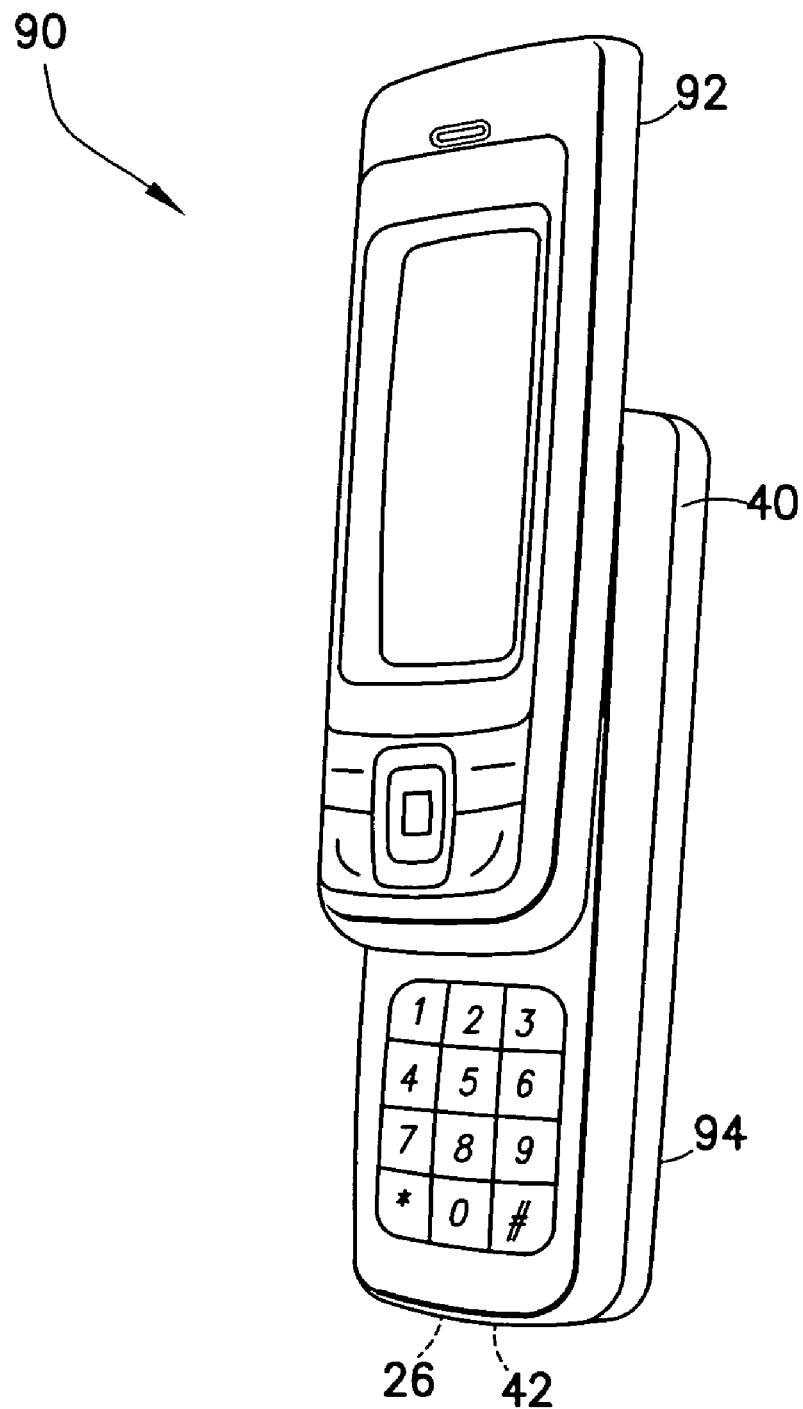
FIG. 9 is a perspective view of an alternate embodiment of the device shown in FIG. 1.

Referring now to FIG. 9, there is shown another embodiment of the invention. In this embodiment the device 90 is a slide-type mobile telephone. The second housing 92 is adapted to slide up and down on the first housing 94. The second housing 94 is spring biased towards the open position shown in FIG. 9. A permanent magnet latch system having a permanent magnet 26 is adapted to latch the second housing 94 in its down, closed position. The phone 90 has a release system which includes a user actuated button 40 and an electromagnetic coil 42.

Figure 11:
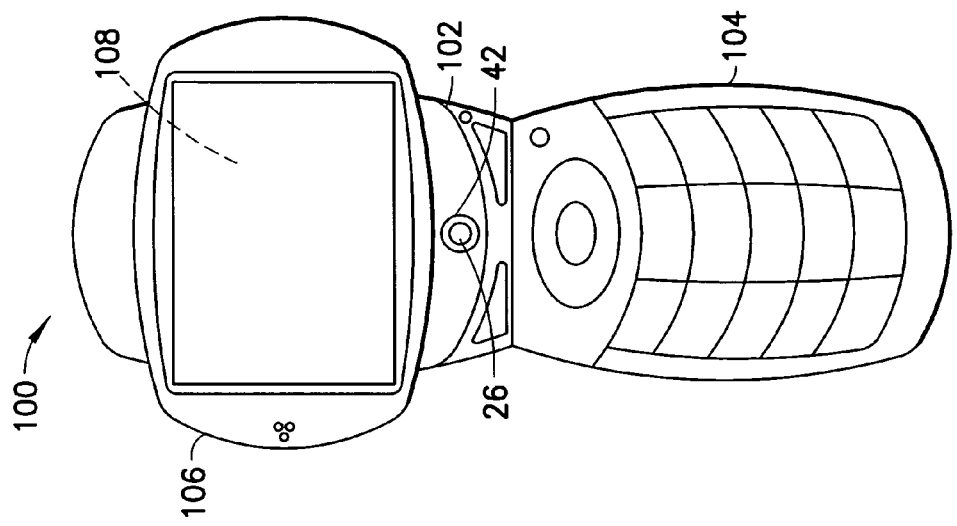
FIGS. 10-11 are front views of another alternate embodiment of the device shown in FIG. 1.
Figure 10:
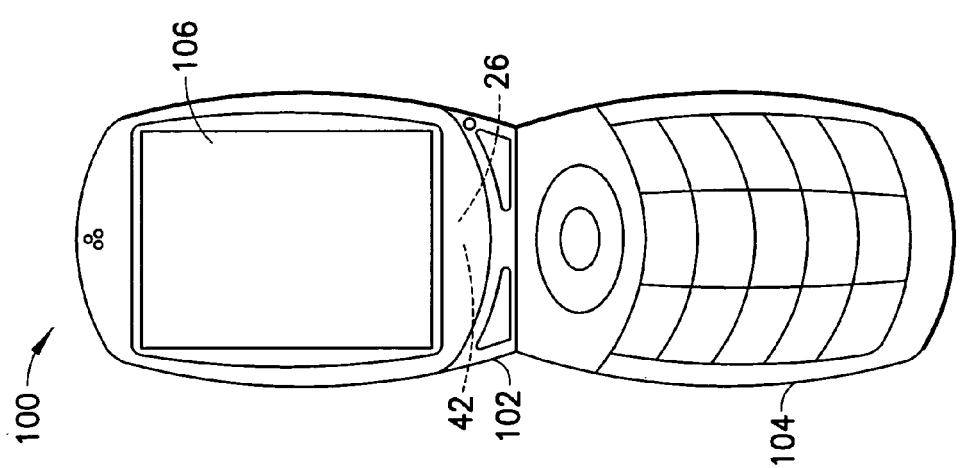

Referring now to FIGS. 10-11, there is shown another embodiment of the invention. In this embodiment the device 100 is a flip-type mobile telephone. However, the phone 100 has a movable display and display housing 106 on the second housing member 102. The first housing member 104 and the second housing member 102 can be flipped open and closed relative to each other. The display and display housing 106 can rotate on the second housing member 102. The phone 100 has a latch system with a permanent magnet 26 for latching the display and display housing 106 relative to the second housing member 102 at the portrait position shown in FIG. 10. The phone also has a release system for disengaging the magnetic hold of the permanent magnet 26 to allow a spring 108 to bias the display and display housing 106 to the landscape position shown in FIG. 11. Similar to the embodiments described above, the release system includes an electromagnetic coil 42. In an alternate embodiment, the display and display housing 106 could be spring biased in the portrait position and the magnet latch system could be adapted to automatically allow it to move from the landscape position.

Figure 13:
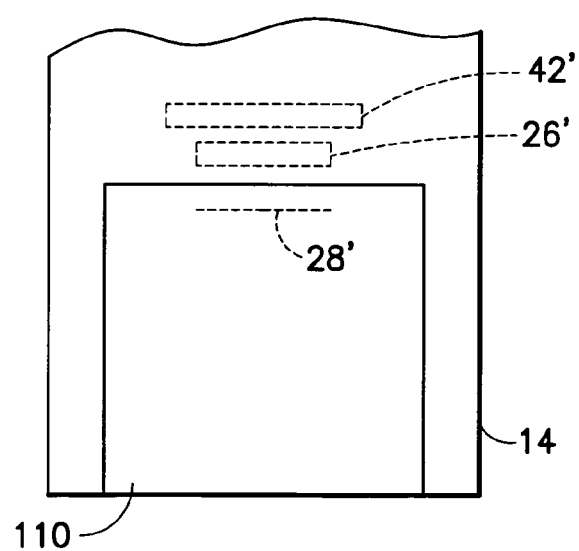
FIG. 13 is a partial rear side view of the device shown in FIG. 1.

The invention can be used to form a magnet controlled push-to-open mechanism for a folding form factor product. In the embodiment of FIG. 13, a foldable product can be kept under constant opening torque by a spring in the hinge. The permanent magnet 26 can keep the product closed by magnetic attraction to an iron anchor 28. When the user activates a button, an electrical current in a coil 42 can turn the iron anchor 28 into an electromagnet with an opposite directed magnetic force greater than the permanent magnet, thus allowing the spring force to open the product.

Figure 12:
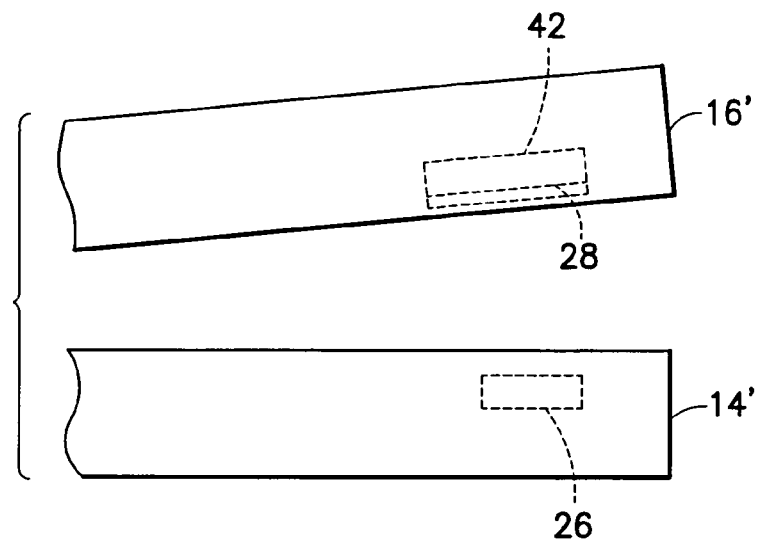
FIG. 12 is a partial side view of another alternate embodiment of the device shown in FIG. 1.

The first and second housing members 104, 102 could have their own magnet latch and electromagnet release systems similar to those described above or could merely be manually opened, or perhaps have a mechanical opening system rather than a magnetic/electromagnet system. In another alternate embodiment as shown in FIG. 12, the coil 42 and the magnet could be located in separate housing members 14', 16'.

Referring also to FIG. 13 and as noted above, the invention could be used to latch a utility housing member 110, such as a battery cover or SIM door for example, to another housing member 14. In this embodiment the cover or door 110 could comprise the ferromagnetic member 28', and both the permanent magnet 26' and the coil 42' could be on the first housing member 14. In another type of embodiment, the first and second housing members of the phone could be biased by a spring towards a closed position with the permanent magnet retaining the housing members at an open position. Thus, the electromagnetic release system could be used as a push-to-release closing system rather than a push-to-release opening system.

In another alternate embodiment, the coil 42 and or the permanent magnet 26 might to used for an additional function (s). For example, the coil 42 might be used as a vibra (vibrator), or a position sensor, or for metal detecting, or a telecoil or T-coil of a hearing aid compatible (HAC) system in a telephone which is used to interconnect the speaker of a phone magnetically into a hearing aid device, similar to the system described in U.S. patent application Ser. No. 11/015,518 which is hereby incorporated by reference in its entirety. As another example, the permanent magnet could be part of the speaker.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A hand-held portable electronic device housing latch and release system comprising:
    a permanent magnet adapted to be connected to a first housing member of a hand-held portable electronic device;
    a magnet latch plate adapted to be connected to a second housing member of the hand-held portable electronic device, wherein a magnetic field of the permanent magnet is adapted to exert a magnetic holding force on the magnet latch plate when the first and second housing members are in a first position relative to each other;
    a spring adapted to bias the first and second housing members away from the first position; and
    an electromagnetic coil at least partially surrounding the permanent magnet, the coil being adapted to be energized by a battery of the hand-held portable electronic device and adapted to at least partially reduce the magnetic holding force by the permanent magnet on the magnet latch plate when the coil is energized to allow the spring to move the housing members towards a second different position relative to each other.

2. A system as in claim 1 wherein the first position is a closed position and the second position is an open position.

3. A system as in claim 1 further comprising a controller to control energizing of the coil based upon at least one operation of electronic circuitry in the hand-held portable electronic device.

4. A system as in claim 1 further comprising a switch adapted to be actuated by a user to energize the coil.

5. A hand-held portable electronic device comprising the housing latch and release system as in claim 4 wherein the switch is located on the first housing member or the second housing member.

6. A hand-held portable electronic device comprising the housing latch and release system as in claim 1, wherein the device comprises a mobile telephone.

7. A hand-held portable electronic device comprising the housing latch and release system as in claim 1 wherein the first housing member is rotatably mounted relative to the second housing member.

8. A hand-held portable electronic device comprising the housing latch and release system as in claim 1 wherein the first housing member is slidably mounted relative to the second housing member.

9. A hand-held portable electronic device comprising the housing latch and release system as in claim 1 wherein the electromagnetic coil is located behind a cover of the first housing member or the second housing member.

10. A hand-held portable electronic device comprising:
    electronic circuitry including a battery and a display;
    a housing having the electronic circuitry therein, wherein the housing comprises a first housing member movably connected to a second housing member between a first position and a second position, wherein the housing comprises at least one spring adapted to bias the first and second housing members in a direction away from the first position and towards the second position;
    a latch system for latching the first and second housing members in the first position, wherein the latch system comprises a permanent magnet and a ferromagnetic member on respective ones of the housing members; and
    a latch release system comprising an electromagnetic field generator connected to the housing, wherein the electromagnetic field generator is adapted to be powered by the battery of the hand-held portable electronic device, wherein the electromagnetic field generator is adapted to generate a magnetic field which is aligned relative to a magnetic field of the permanent magnet to at least partially reduce magnetic attraction of the permanent magnet on the ferromagnetic member to allow the first and second housing members to be moved relative to each other by the spring.

11. A hand-held portable electronic device as in claim 10 wherein the device comprises a mobile telephone.

12. A hand-held portable electronic device as in claim 10 wherein the electronic circuitry comprises a transceiver.

13. A hand-held portable electronic device as in claim 10 wherein the first housing member is pivotably connected to the second housing member.

14. A hand-held portable electronic device as in claim 10 wherein the first housing member is slidably connected to the second housing member.

15. A hand-held portable electronic device as in claim 10 wherein the electromagnetic field generator comprises an electromagnetic coil.

16. A hand-held portable electronic device as in claim 10 wherein the electronic circuitry comprises a controller to control energizing of the electromagnetic field generator based upon at least one operation of the electronic circuitry.

17. A hand-held portable electronic device as in claim 10 further comprising a switch adapted to be actuated by a user to energize the electromagnetic field generator.

18. A method of manufacturing a hand-held portable electronic device comprising:
    connecting a permanent magnet to a first housing member of the hand-held portable electronic device;
    connecting a ferromagnetic member to a second housing member;
    movably connecting the first and second housing members to each other, wherein the first and second housing members are movable relative to each other between a first position and a second position, wherein the first and second housing members are biased by a spring in a direction away from the first position;
    connecting an electromagnetic coil to the first or second housing member to at least partially surround the permanent magnet when the housing members are in the first position to allow a magnetic field of the coil to reduce a magnetic attraction of the permanent magnet on the ferromagnetic member.

19. A method of opening a hand-held portable electronic device comprising:
providing the device with a first housing member having a permanent magnet and a second housing member having a ferromagnetic member, wherein the first housing member is adapted to be held in a single hand of a user, wherein the first and second housing members are maintained at a first position by the permanent magnet and the ferromagnetic member, and wherein a spring exerts a biasing force to bias the housing members in a direction away from the first position; and
energizing an electromagnetic coil of the hand-held portable electronic device with power from a battery of the hand-held portable electronic device to generate a magnetic field which is aligned with and opposite a magnetic field of the permanent magnet to reduce the magnetic field of the permanent magnet and thereby reduce a magnetic attraction of the permanent magnet on the ferromagnetic member and thereby allow the spring to move the housing members away from the first position.

20. A method as in claim 19 wherein energizing an electromagnetic coil comprises a user actuating a switch on the hand-held portable electronic device.

21. A method as in claim 19 wherein energizing an electromagnetic coil comprises an electronic controller of the hand-held portable electronic device automatically energizing the coil based upon a predetermined event.

* * * * *